(12) United States Patent
Hu (10) Patent No.: US 12,523,512 B2
(45) Date of Patent: Jan. 13, 2026

(54) INTELLIGENT COFFEE AND TEA MEASURING CUP

(71) Applicant: Dongguan Gan Lin Electronic Technology Co., Ltd., Guangdong (CN)

(72) Inventor: Huanyou Hu, Guangxi (CN)

(73) Assignee: DONGGUAN GAN LIN ELECTRONIC TECHNOLOGY CO., LTD., Dongguan (CN)

( * ) Notice: Subject to any disclaimer, the term of this patent is extended or adjusted under 35 U.S.C. 154(b) by 354 days.

(21) Appl. No.: 18/243,684

(22) Filed: Sep. 8, 2023

(65) Prior Publication Data

US 2024/0410736 A1  Dec. 12, 2024

(30) Foreign Application Priority Data

Jun. 6, 2023  (CN) .......................... 202310663290.7

(51) Int. Cl.
  *G01G 19/52*  (2006.01)
  *A47J 45/06*  (2006.01)
  *G01F 19/00*  (2006.01)

(52) U.S. Cl.
  CPC .......... *G01F 19/007* (2013.01); *A47J 45/068* (2013.01); *A47J 2202/00* (2013.01)

(58) Field of Classification Search
  CPC ...... G01F 19/007; G01F 23/20; A47J 45/068; A47J 2202/00; A47J 31/52; A47J 31/5253; A47J 36/00; G01G 19/52; A47G 19/2227; A47G 2019/225; A47G 2200/166; A47G 2200/223; G01K 1/02
  USPC .............. 73/291, 292, 296, 426, 427, 432.1; 374/141, 142, 157; 220/495.03, 703, 220/710.05, 756
  See application file for complete search history.

(56) References Cited

FOREIGN PATENT DOCUMENTS

| CN | 115251708 A | * | 11/2022 | ............ A47J 31/525 |
| CN | 116473408 A | * | 7/2023 | ......... A47G 19/2227 |
| CN | 116509198 A | * | 8/2023 | ............ A47J 31/005 |
| FR | 2960407 A1 | * | 12/2011 | ............... A47J 31/56 |

* cited by examiner

*Primary Examiner* — Robert R Raevis
(74) *Attorney, Agent, or Firm* — WPAT, PC (57) ABSTRACT

An intelligent coffee and tea measuring cup includes a cup body, a weighing unit, a temperature sensing unit, an information storage and execution unit, and a display unit. An upper end and a lower end of the cup body are provided with openings respectively, and an outer side of the cup body is provided with a handle. The weighing unit is used to measure a weight of liquid, particles or powder loaded into a metal cup liner. The temperature sensing unit is used to detect a temperature inside the metal cup liner. The information storage and execution unit includes a timer, a reciprocal counter, a record storage and an alarmer. The display unit is electrically connected to the information storage and execution unit. The cup has diverse functions, meets needs of users, is simple in structure and convenient to use, and is convenient to carry.

14 Claims, 5 Drawing Sheets

INTELLIGENT COFFEE AND TEA MEASURING CUP

TECHNICAL FIELD

The disclosure relates to the technical field of life utensils, and particularly to an intelligent coffee and tea measuring cup.

BACKGROUND

With an improvement of people's living standards, tea and coffee have become a favorite of contemporary people. Because the coffee contains a small amount of caffeine, the caffeine can stimulate the central nervous system, heart and respiratory system to reduce muscle fatigue and promote a secretion of digestive juices. Therefore, the coffee has become a popular drink for many workers, and the coffee, as the popular drink in the world, has also been loved by many people.

However, when the coffee or the tea is brewed, due to a lack of a measuring tool, the proportion of the tea and hot water, coffee powder and hot/cold water or milk or sugar added in a cup is uneven, which affects a taste of the coffee or the tea. If a user prepares coffee or tea with taste suitable for the user, a measuring tool needs to be additionally purchased, which leads to increased costs, takes up space, and is inconvenient to carry. In addition, the user needs to use the measuring tool to mix the proportion at a specific location, and the proportion of the coffee and the tea cannot be accurately prepared based on the hand feeling of the user, which cannot meet the daily specific taste of the coffee and the tea for the user. At present, there are some intelligent water cups on the market with a weighing function, but it is impossible to record habits of the user and record the proportion of the coffee or the tea prepared by the user. When the coffee or tea is prepared, the weighing needs to be manually memorized, so that the weighing is cumbersome, the function is relatively simple, and the requirements of the user cannot be met. Therefore, it is necessary to design an intelligent coffee and tea measuring cup.

SUMMARY

In order to meet a daily specific taste of coffee or tea of user, record a weight ratio of each ingredient in a preparation of coffee or tea to set the weight ratio to meet an experience of the user, and overcome the problems that need to purchase additional measuring tools, a problem resulting in increased costs, a space taken by the additional measuring tools and inconvenience to carry. It is necessary to use the measuring tool to blend the weight ratio to a specific location and now there are also some intelligent water cups on the market with weighing functions. However, it is impossible to record the habits of the user and record the proportion of coffee or tea mixed by the user. When coffee or tea is prepared, the weighing needs to be manually memorized, so that the weighing is cumbersome, the function is relatively simple, and the requirements of the user cannot be met. Therefore, an intelligent coffee and tea measuring cup is provided.

To solve the above problems, the disclosure provides the following technical solutions as follows.

Specifically, an intelligent coffee and tea measuring cup includes a cup body, a metal cup liner, a weighing unit, a temperature sensing unit, an information storage and execution unit and a display unit.

An upper end and a lower end of the cup body each are provided with an opening, an inner side of the cup body is separated by a partition plate to form a cup liner accommodating cavity and a weighing cavity disposed at an upper layer and a lower layer thereof, and an outer side of the cup body is also provided with a handle.

The metal cup liner is suspended in the cup liner accommodating cavity.

The weighing unit is disposed in the weighing cavity and is configured (i.e., structured and arranged) to accurately measure a weight of liquid, particles or powder loaded into the metal cup liner.

The temperature sensing unit is attached to a bottom of the metal cup liner and is configured to detect a temperature inside the metal cup liner.

The information storage and execution unit is electrically connected to the weighing unit and the temperature sensing unit. The information storage and execution unit includes a timer, a reciprocal counter, a record storage, and an alarmer. The timer is configured to calculate a time of brewing coffee. The reciprocal counter is configured to count a weight one of brewing water, fresh milk, coffee powder, tea and particles The record storage is configured to record one of the time of brewing coffee and a time of brewing tea, record a weight ratio of water to one of the coffee powder, the tea and the particles to realize setting and preservation of coffee brewing taste or tea brewing taste of a user. The alarmer is configured to send a necessary reminder to the user according to a value set by the timer and a value set by the reciprocal counter.

The display unit is electrically connected to the information storage and execution unit, and is configured to display the weight, the time of brewing coffee, the temperature and a countdown.

In an embodiment, the handle is hollow, the information storage and execution unit and the display unit are disposed inside the handle, and the display unit is embedded on the handle and a part of the display unit is exposed to outside of the handle.

In an embodiment, the cup further includes an energy storage unit, which is electrically connected to the information storage and execution unit and is configured to provide power to the weighing unit, the temperature sensing unit and the display unit. The information storage and execution unit is provided with a charging interface, and an end of the charging interface passes through the handle.

In an embodiment, an open end of the metal cup liner is formed with a rolled lip around a periphery of the upper end of the cup body, and the upper end of the cup body is provided with a recess part, which is wrapped by the rolled lip; a recessing size of the recess part is consistent with a thickness of the rolled lip.

In an embodiment, the cup further includes a big cup cover buckled on the metal cup liner. A middle of the big cup cover is formed with a cup month, and a periphery of the cup mouth is formed with a convex edge facing upwardly.

In an embodiment, the cup further includes a small cup cover buckled on the cup month. A periphery of the small cup cover is formed with an annular sealing groove, and an inner side wall of the convex edge is formed with an annular convex ring matched with the annular sealing groove. The small cup cover is connected to a locked lid buckled with the small cup cover.

In an embodiment, the opening at the lower end of the cup body is provided with a bottom cover, and a bottom of the bottom cover is provided with an antiskid pad.

In an embodiment, an inner wall of the cup body located in the cup liner accommodating cavity is evenly provided with convex ribs set from top to bottom, and the convex ribs abut against the metal cup liner.

In an embodiment, a diameter of the cup body gradually increases from the lower end to the upper end.

In an embodiment, the weighing unit is a gravity sensor, and the temperature sensing unit is a temperature sensor.

The beneficial effects of the disclosure are as follows.

By providing the information storage and execution unit, the weighing unit, the temperature sensing unit and the display unit, the weight of each material added to the metal cup liner is accurately measured by the weighing unit to prepare coffee that is suitable for the taste of the user, and the specific gravity of each material is recorded by the information storage and execution unit so as to be set and stored to be a habitual taste of the user. When preparing coffee or tea each time, the user calls out the record, and the weighing unit accurately measures the weight of the material when it is added to the metal cup liner. After an accurate set value is reached, the alarmer reminds the user to stop adding the material, the user changes to add another material, and the materials are sequentially added to prepare the coffee or tea with the habitual taste of the user, which improves the experience of the user. In this situation, the temperature sensing unit is provided to display the temperature through the display unit to prevent coffee from overheating to avoid scalding, and when the coffee temperature reaches the off-flavor temperature, the alarmer also plays a role in reminding. The disclosure provides the information storage and execution unit, the weighing unit, the temperature sensing unit and the display unit, and the specific gravity of the material prepared by the user during brewing is recorded by the information storage and execution unit so as to record the habitual taste of the coffee or the tea of the user, no need for the user to memorize, so that the experience of the user in using the intelligent coffee and tea measuring cup is increased. The intelligent coffee and tea measuring cup has diverse functions such as memory function, display function, temperature display function and reminding function, which meets the needs of customers. The intelligent coffee and tea measuring cup of the disclosure also has a simple structure and is convenient to use, and is convenient to carry because all components are disposed on the cup body.

In attached drawings, description of reference signs is listed as follows:
- 10. cup body; 101. partition plate; 102. cup liner accommodating cavity; 103. weighing cavity; 104. handle; 105. recess part; 106. bottom cover; 107. antiskid pad; 108. convex rib; 20. metal cup liner; 201. rolled lip; 30. weighing unit; 40. temperature sensing unit; 50. information storage and execution unit; 501. charging interface; 60. display unit; 70. big cup cover; 701. cup month; 702. convex edge; 7021. annular convex ring; 703. small cup cover; 7301. annular sealing groove; 7032. locked lid; 704. sealing ring; 705. wrapping-seizing edge; 80. energy storage unit.

DETAILED DESCRIPTION OF EMBODIMENTS

The following is description of the principle and features of the disclosure in combination with the attached drawings, and illustrated embodiments are merely used to explain the disclosure and are not intended to limit the scope of the disclosure.

The disclosure provides the following embodiments.

Figure 1:
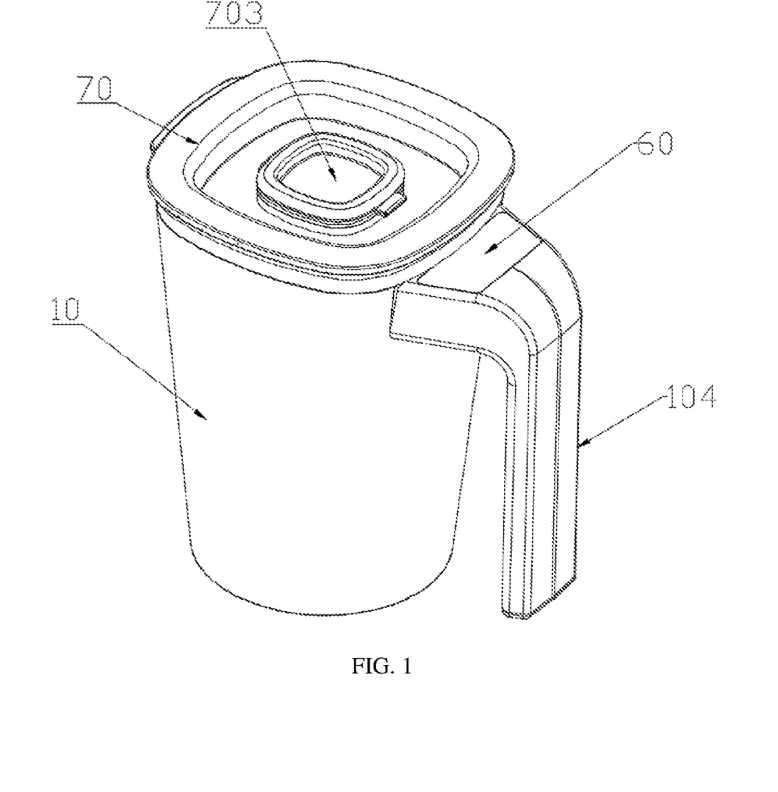
FIG. 1 is a schematic structural diagram of an overall structure of the disclosure.
Figure 2:
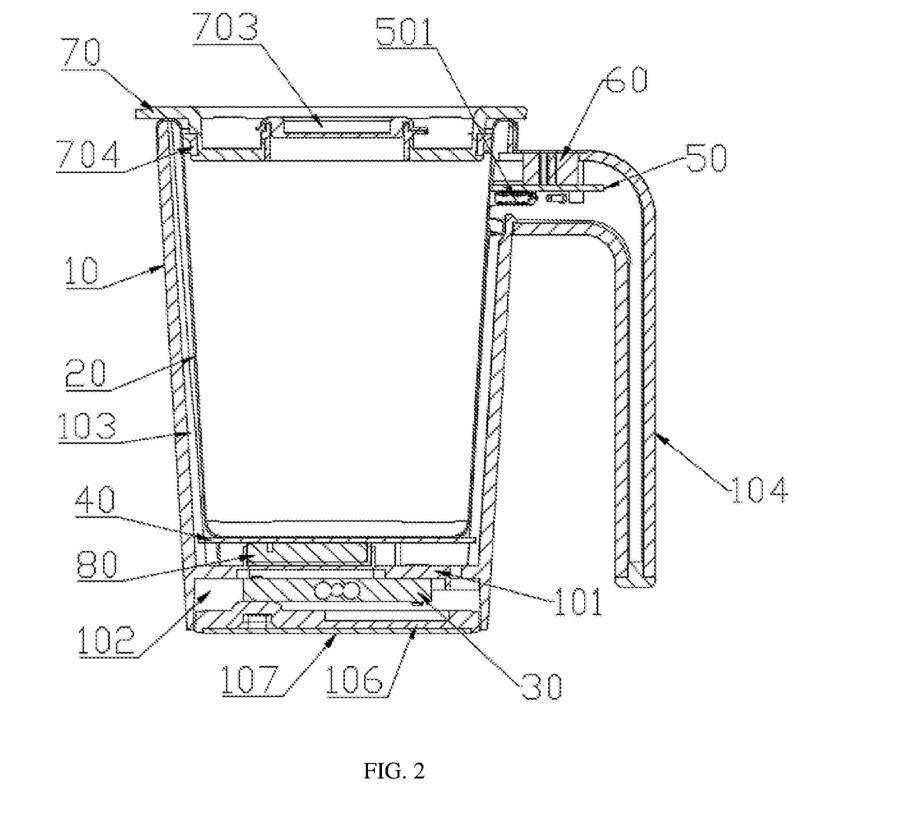
FIG. 2 is a cross-sectional view of the disclosure.
Figure 3:
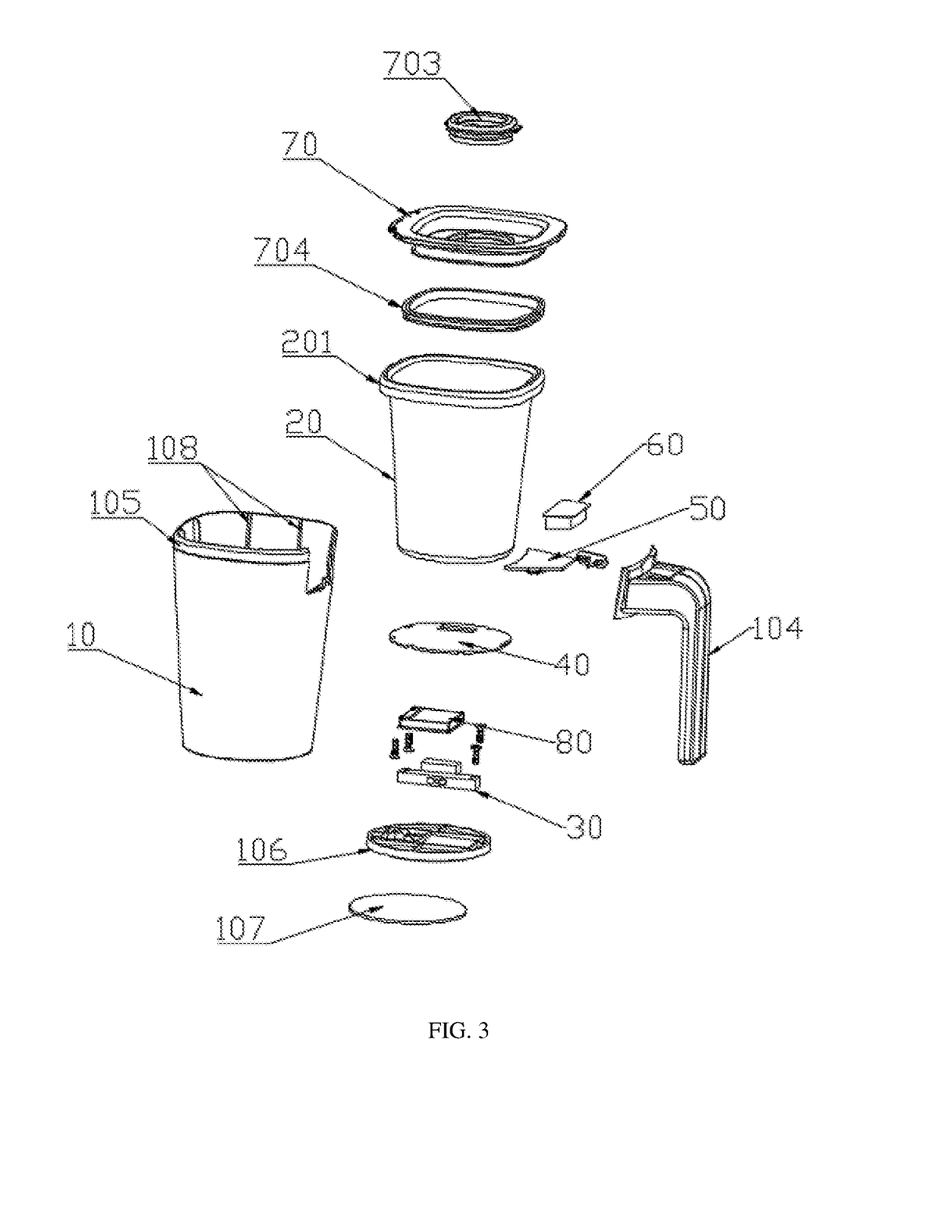
FIG. 3 is an exploded view of the disclosure.

As shown in FIGS. 1-3, an intelligent coffee and tea measuring cup includes a cup body 10, a metal cup liner 20, a weighing unit 30, a temperature sensing unit 40, an information storage and execution unit 50 and a display unit 60. A diameter of the cup body 10 gradually increases from a lower end to an upper end, the upper end and the lower end of the cup body 10 each are provided with an opening, and an inner side of the cup body 10 is separated by a partition plate 101 to form a cup liner accommodating cavity 102 and a weighing cavity 103 correspondingly disposed at an upper layer and a lower layer thereof. An outer side of the cup body 10 is provided with a handle 104, the handle 104 is hollow, the information storage and execution unit 50 and the display unit 60 are disposed inside the handle 104, and the display unit 60 is embedded on the handle 104 and a part of the display unit 60 is exposed to an outside of the handle 104. The metal cup liner 20 is suspended in the cup liner accommodating cavity 102, the temperature sensing unit 40 is attached to a bottom of the metal cup liner 20 and is used to detect a temperature inside the metal cup liner 20. The weighing unit 30 is disposed in the weighing cavity 103 and is used to accurately measure a weight of liquid, particles or powder loaded into the metal cup liner 20. In the embodiment, the display unit 60 is a touch screen, the weighing unit 30 is a gravity sensor, and the temperature sensing unit 40 is a temperature sensor.

Figure 4:
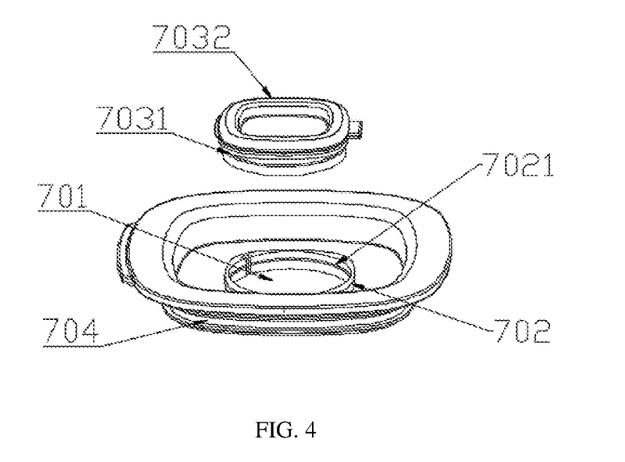
FIG. 4 is a schematic structural diagram of a big cup cover and a small cup cover according to an embodiment of the disclosure.
Figure 5:
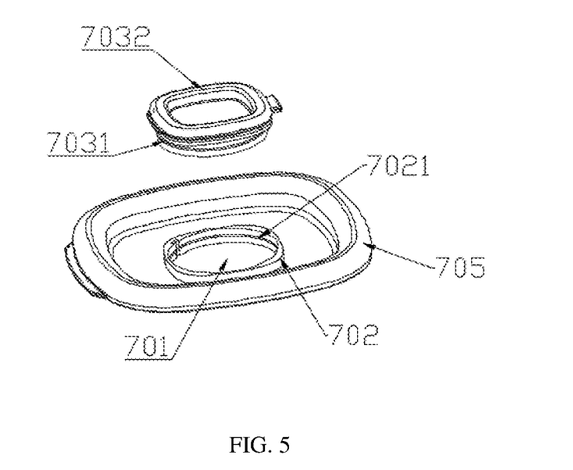
FIG. 5 is a schematic structural diagram of a big cup cover and a small cup cover according to another embodiment of the disclosure.

In the embodiment, an open end of the metal cup liner 20 is formed with a rolled lip wrapped around a periphery of the opening at the upper end of the cup body 10, and the outer wall of the opening at the upper end of the cup body 10 is recessed inward to form a recess part 105 wrapped by the rolled lip 201. A recessing size of the recess part 105 is consistent with a thickness of the rolled lip 201, the recess part 105 is set to facilitate the assembly of the metal cup liner 20 and the cup body 10. In addition, the recessing size of the recess part 105 is set to be consistent with the thickness of the rolled lip 201, so that a bottom surface of the rolled lip 201 is attached to an end surface of the recess part 105, so as to avoid the rolled lip 201 protruding from the outside of the cup body 10 and ensure the beauty of the intelligent coffee and tea measuring cup. Moreover, as shown in FIG. 4, the cup further includes a big cup cover 70 buckled on the metal cup liner 20, a side wall of the big cup cover is provided with a sealing ring 704 abutted against the metal cup liner 20, so that the big cup cover 70 and the metal cup liner 20 are sealed to play a role in heat preservation. A middle of the big cup cover 70 is provided with a cup month 701, and a periphery of the cup mouth 701 is formed with a convex edge 702 facing upwardly, and a small cup cover 703 is buckled on the cup month 701. A periphery of the small cup cover 703 is formed with an annular sealing groove 7031, and an inner side wall of the convex edge 702 is formed with an annular convex ring 7021 matched with the annular sealing groove 7031. The small cup cover 703 is connected to a locked lid 7032 buckled with the small cup cover 703. By setting the cup mouth 701 on the big cup cover 70 and opening the locked lid 7032 on the small cup cover 703, a specific funnel can be inserted into the intelligent coffee and tea measuring cup, which is convenient for pouring into the coffee powder, and the specific funnel prevents the coffee powder from flowing out of the intelligent coffee and tea measuring cup and causing the waste of materials. It can also be inserted into a straw to suck coffee, and setting the big cup cover 70 and the small cup cover 703 can make the intelligent coffee and tea measuring cup have a certain heat preservation effect. In an embodiment, as shown in FIG. 5, a periphery of the big cup cover is formed with a wrapping-seizing edge 705, the wrapping-seizing edge 705 is clamped tightly with the rolled lip, and the inner wall of the big cup cover 70 is pressed on the inner surface of the metal cup liner 20 to achieve sealing.

Figure 6:
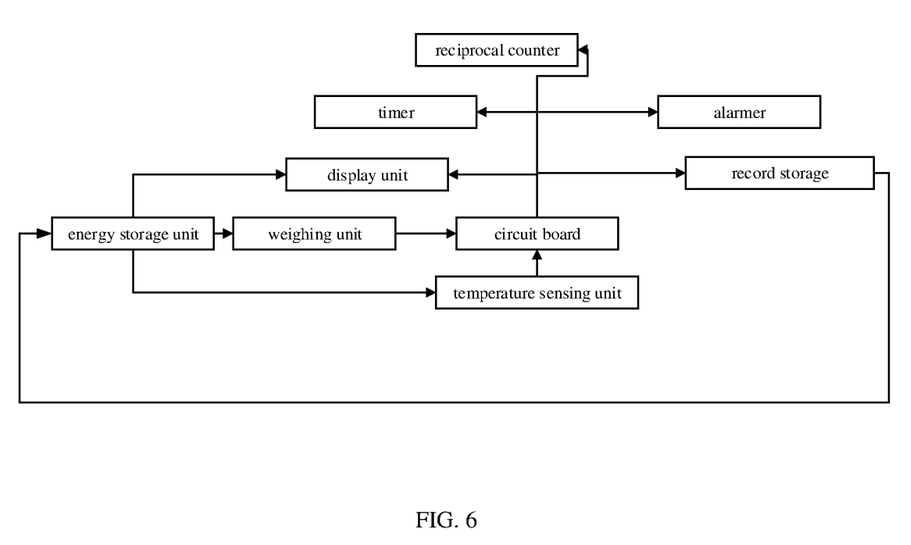
FIG. 6 is a schematic flowchart of operation of the disclosure.

In an embodiment, as shown in FIG. 6, the information storage and execution unit 50 utilizes a circuit board; and a timer, a reciprocal counter, a record storage and an alarmer are all disposed on the circuit board. The alarmer is used to send necessary reminders to the user according to values set by the timer and the reciprocal counter, the alarmer is provided with a horn and a light emitting diode. The timer is mainly used to accurately calculate a time of brewing coffee. Through the timer, the time of brewing coffee can be calculated, so that the user can drink the best taste of coffee in a specific time. Once the set time is reached, the alarmer reminds the user to drink without the user observing at all times, which is convenient to use. The record storage is mainly used to record the time of brewing coffee of the user, the added weight of the coffee powder and the added weight of the water, or the added weight of sugar particles, or the added weight of fresh milk, so that the coffee taste of the user is recorded, set, and stored through the record storage as the habitual taste of the user. The reciprocal counter is mainly used to accurately count down the added weight of water, fresh milk, or coffee powder or particles, through the setting, the coffee that users are accustomed to drinking can be prepared.

When preparing coffee, a set record is called out through the display unit 60, for example, the set taste is 1, and the set 1 is called out. A total weight displayed on the display unit 60 is 320 grams, of which 20 grams are the specific gravity of coffee powder and 300 grams are the specific gravity of hot water. First, the coffee powder is poured into the metal cup liner 20, the coffee powder is accurately weighed through the weighing unit 30, and the signal is fed back to the circuit board. As the amount of coffee powder poured increases, the reciprocal counter counts down, and the countdown value is displayed on the display unit 60 until the value reaches the set value of 300 from 320. After reaching the accurate value of 300, the alarmer sends an alarm to remind the user that the appropriate weight of coffee powder has been reached, and then hot water is added into the metal cup liner 20. The reciprocal counter performs countdown until the value reaches the set value of 0 from 300. After reaching the accurate value of 0, the alarmer sends the alarm to remind the user that the appropriate weight of hot water has been reached. After completion, the display unit 60 displays the time and the temperature of the brewing coffee. The time of brewing coffee can be set according to the taste of the user, for example, 3 minutes, the time of brewing coffee is counted down, the user closes the locked lid 7032 to further blend the coffee powder and the hot water to thereby improve the taste of the coffee, when the accurate value is reached, the alarmer reminds the user that the coffee can be drunk. It should be noted that if the user often only drinks pure coffee, the taste can be set to 1. If the user is accustomed to drinking coffee with fresh milk, the taste can be set to 2. If the user is still accustomed to adding sugar to pure coffee, the taste can be set to 3. If the user also drinks coffee with other flavors, the taste can be set according to habits of the user. When setting the taste, the user needs to input the weight ratio into the record storage to prepare coffee that is suitable for the taste of the user. In addition, when preparing coffee, the weight value of the funnel inserted on the cup mouth 701 is reset to zero.

When preparing tea, the set record is called out through the display unit 60, for example, the set taste is 11, and the set 11 is called out. A total weight displayed on display unit 60 is 315 grams, of which 15 grams are the specific gravity of the tea and 300 grams are the specific gravity of hot water. First, the tea is poured into the metal cup liner 20, the tea is accurately weighed through the weighing unit 30, and the signal is fed back to the circuit board. As the amount of tea poured increases, the reciprocal counter counts down, and the countdown value is displayed on the display unit 60 until the value reaches the set value of 300 from 315. After reaching the accurate value of 300, the alarmer sends the alarm to remind the user that the appropriate tea weight has been reached, and then hot water is added to the metal cup liner 20. The reciprocal counter performs countdown until the value reaches the set value of 0 from 300. After reaching the accurate value of 0, the alarmer sends an alarm to remind the user that the appropriate weight of hot water has been reached. After completion, the display unit 60 displays the time and temperature of the prepared tea. The time of brewing tea can be set according to the taste of the user, such as 90 seconds, the time of brewing tea is counted down, the user closes the locked lid 7032, and when the countdown reaches the value of 00 second, the alarmer reminds the user that the tea can be drunk.

In a specific embodiment, the handle is hollow, the circuit board and the display unit 60 are disposed inside the handle 104, and an upper end of the handle is provided with a displaying window. The display unit 60 is embedded on the displaying window, which makes it easy for the user to view and use the touch display screen. The hollow setting of the handle 104 can reduce the weight of intelligent coffee and tea measuring cup.

In an embodiment, the cup further includes an energy storage unit 80 electrically connected to the information storage and execution unit 50, which is used to provide power to the weighing unit 30, the temperature sensing unit 40 and the display unit 60. The information storage and execution unit 50 is provided with a charging interface 501, and an end of the charging interface 501 passes through the handle 104. Through the setting, the charging interface 501 can be connected to an external power supply to charge the energy storage unit 80, improving the practicality of the intelligent coffee and tea measuring cup. In the embodiment, the energy storage unit 80 utilizes a lithium battery, and the lithium battery is attached with a heat dissipation adhesive, which can effectively disperse the heat and ensure the service life of the lithium battery.

In an embodiment, the opening at the lower end of the cup body 10 is provided with a bottom cover 106, and a bottom of the bottom cover 106 is provided with an antiskid pad 107. The setting of the bottom cover 106 can prevent dust from entering the weighing cavity 103 and can further avoid affecting the measurement of the weighing unit 30 in the weighing cavity 103, thereby ensuring the taste of the coffee, and the setting of the antiskid pad 107 can avoid collision and prevent the intelligent coffee and tea measuring cup from falling or breaking.

In an embodiment, in order to prevent the metal cup liner 20 suspended in the cup liner accommodating cavity 102 from shaking and loosening, convex ribs 108 are evenly arranged on the inner wall of the cup body 10 located in the cup liner accommodating cavity 102 from top to bottom, and the convex ribs 108 abut against the metal cup liner 20. Through several convex ribs 108 abutting against the metal cup liner 20, the metal cup liner 20 in the cup liner accommodating cavity 102 can be prevented from shaking, ensuring the quality of the intelligent coffee and tea measuring cup.

In conclusion, by providing the information storage and execution unit 50, the weighing unit 30, the temperature sensing unit 40 and the display unit 60, the weight of each material added to the metal cup liner 20 is accurately measured by the weighing unit 30 to prepare coffee or tea that is suitable for the taste of the user, and the specific gravity of each material is recorded by the information storage and execution unit 50 so as to be set and stored to be a habitual taste of the user. When preparing coffee or tea each time, the user calls out the record, whenever a material is added to the metal cup liner 20 and reaches the set weight, the alarmer reminds the user to stop adding, and the user changes to add another material. The materials are sequentially added to prepare the coffee or tea with the habitual taste of the user, which improves the experience of the user. In this situation, the temperature sensing unit 40 is provided to display the temperature through the display unit 60 to prevent coffee from overheating to avoid scalding, and when the coffee temperature reaches the off-flavor temperature, the alarmer also plays a role in reminding. The disclosure provides the information storage and execution unit 50, the weighing unit 30, the temperature sensing unit 40 and the display unit 60, and the specific gravity of the material prepared by the user during brewing is recorded by the information storage and execution unit 50 so as to record the habitual taste of the coffee or the tea of the user, no need for the user to memorize, so that the experience of the user in using the intelligent coffee and tea measuring cup is increased. The intelligent coffee and tea measuring cup has diverse functions such as memory function, display function, temperature display function and reminding function, which meets the needs of customers. The intelligent coffee and tea measuring cup of the disclosure also has a simple structure and is convenient to use, and is convenient to carry because all components are disposed on the cup body.

The above is only illustrated embodiments of the disclosure and is not intended to limit the disclosure. Any modifications, equivalent substitutions, improvements, etc. made within the spirit and principles of the disclosure shall be included in the scope of protection of the disclosure.

What is claimed is:

1. A coffee and tea measuring cup, comprising:
a cup body, wherein an upper end and a lower end of the cup body each are provided with an opening, an inner side of the cup body is separated by a partition plate to form a cup liner accommodating cavity and a weighing cavity correspondingly disposed at an upper layer and a lower layer thereof, and an outer side of the cup body is provided with a handle;
a metal cup liner, suspended in the cup liner accommodating cavity;
a weighing unit, disposed in the weighing cavity, wherein the weighing unit is configured to measure a weight of one of liquid, particles and powder loaded into the metal cup liner;
a temperature sensing unit, attached to a bottom of the metal cup liner and configured to detect a temperature inside the metal cup liner;
an information storage and execution unit, electrically connected to the weighing unit and the temperature sensing unit; and the information storage and execution unit comprising:
a timer, configured to calculate a time of brewing coffee;
a reciprocal counter, configured to count down a weight of one of brewing water, fresh milk, coffee powder, tea and particles;
a record storage, configured to record one of the time of brewing coffee and a time of brewing tea and record a weight ratio of water to one of the coffee powder, the tea and the particles to realize setting and preservation of one of coffee brewing taste and tea brewing taste of a user; and
an alarmer, configured to send a reminder to the user according to a value set by the timer and a value set by the reciprocal counter; and
a display unit, electrically connected to the information storage and execution unit, wherein the display unit is configured to display the weight, the time of brewing coffee, the temperature and a countdown.

2. The coffee and tea measuring cup as claimed in claim 1, wherein the handle is hollow, the information storage and execution unit and the display unit are disposed inside the handle, the display unit is embedded on the handle and a part of the display unit is exposed to outside of the handle.

3. The coffee and tea measuring cup as claimed in claim 2, further comprising an energy storage unit, wherein the energy storage unit is electrically connected to the information storage and execution unit and is configured to provide power to the weighing unit and the temperature sensing unit; the information storage and execution unit is provided with a charging interface, and an end of the charging interface passes through the handle.

4. The coffee and tea measuring cup as claimed in claim 1, wherein an open end of the metal cup liner is formed with a rolled lip wrapped around a periphery of the opening at the upper end of the cup body, and the upper end of the cup body is provided with a recess part wrapped by the rolled lip; and a recessing size of the recess part is consistent with a thickness of the rolled lip.

5. The coffee and tea measuring cup as claimed in claim 4, further comprising a big cup cover buckled on the metal cup liner, wherein a middle of the big cup cover is formed with a cup month, and a periphery of the cup mouth is formed with a convex edge facing upwardly.

6. The coffee and tea measuring cup as claimed in claim 5, wherein a side wall of the big cup cover is provided with a sealing ring, and the sealing ring abuts against the metal cup liner.

7. The coffee and tea measuring cup as claimed in claim 5, further comprising a small cup cover buckled on the cup mouth, wherein a periphery of the small cup cover is formed with an annular sealing groove, an inner side wall of the convex edge is formed with an annular convex ring matched with the annular sealing groove, and the small cup cover is connected to a locked lid buckled with the small cup cover.

8. The coffee and tea measuring cup as claimed in claim 1, wherein the opening at the lower end of the cup body is provided with a bottom cover, and a bottom of the bottom cover is provided with an antiskid pad.

9. The coffee and tea measuring cup as claimed in claim 1, wherein an inner wall of the cup body located in the cup liner accommodating cavity is evenly provided with convex ribs disposed from top to bottom, and the convex ribs abut against the metal cup liner.

10. The coffee and tea measuring cup as claimed in claim 9, wherein a diameter of the cup body gradually increases from the lower end to the upper end.

11. The coffee and tea measuring cup as claimed in claim 1, wherein the weighing unit is a gravity sensor, and the temperature sensing unit is a temperature sensor.

12. The coffee and tea measuring cup as claimed in claim 1, wherein the information storage and execution unit is a circuit board with the timer, the reciprocal counter, the record storage and the alarmer disposed thereon.

13. The coffee and tea measuring cup as claimed in claim 12, wherein the circuit board and the display unit are disposed inside the handle; an upper end of the handle is provided with a displaying window, and the display unit is embedded on the displaying window.

14. The coffee and tea measuring cup as claimed in claim 1, wherein the alarmer is provided with a horn and a light emitting diode.

* * * * *